(12) United States Patent
Lust

(10) Patent No.: US 10,760,954 B2
(45) Date of Patent: Sep. 1, 2020

(54) QUANTUM RESOLUTION IMAGING

(71) Applicant: Honeywell International Inc., Morris Plains, NJ (US)

(72) Inventor: Lisa M. Lust, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 78 days.

(21) Appl. No.: 16/001,726

(22) Filed: Jun. 6, 2018

(65) Prior Publication Data

US 2019/0376843 A1    Dec. 12, 2019

(51) Int. Cl.
    *G01J 1/04*    (2006.01)
    *G01J 1/42*    (2006.01)

(52) U.S. Cl.
    CPC .......... *G01J 1/0425* (2013.01); *G01J 1/0407* (2013.01); *G01J 1/42* (2013.01)

(58) Field of Classification Search
    CPC .......... G01J 1/0425; G01J 1/42; G01J 1/0407
    See application file for complete search history.

(56) References Cited

U.S. PATENT DOCUMENTS

| | | | | |
|---|---|---|---|---|
| 3,858,203 A | * | 12/1974 | Constant | G01S 7/411 342/351 |
| 2011/0285995 A1 | * | 11/2011 | Tkaczyk | G01J 3/02 356/326 |

OTHER PUBLICATIONS

Yeirolatsitis Set al: "Mode-selective photonic lanterns from multicore fibres", 2017 Optical Fiber Communications Conference and Exhibition (OFC), OSA, Mar. 19, 2017 (Mar. 19, 2017), 3 pages.
Parniak et al: "Beating the Rayleigh Limit Using Two-Photon Interference", Arxiv.Org, Cornell University Library, 201 Olin Library Cornell University Ithaca, NY 14853, Mar. 19, 2018, 6 pages.
Robert R. Thomson et al: "Ultrafast laser inscription: an enabling technology for astrophotonics", Optics Express, vol. 17, No. 3, Feb. 2, 2009 (Feb. 2, 2009), 7 pages.
Extended Search Report from related European Application No. 18188379.4, dated Nov. 20, 2019, 7 pages.

* cited by examiner

*Primary Examiner* — Tony Ko
(74) *Attorney, Agent, or Firm* — Brooks, Cameron & Huebsch, PLLC

(57) ABSTRACT

Quantum resolution imaging methods and devices are disclosed herein. The quantum resolution imaging device comprises an optical component provided to receive incoming radiation, a mode separating structure for separating the received incoming radiation into multiple modes, and an imaging array having multiple array elements for measuring an energy level of each mode to construct an image of the received incoming radiation as it comes in contact with a surface of one of the array elements.

20 Claims, 4 Drawing Sheets

QUANTUM RESOLUTION IMAGING

TECHNICAL FIELD

The present disclosure relates to super-resolution sub diffraction imaging.

BACKGROUND

Direct imaging can be executed by using a series of lenses or apertures to focus an image on a plane and then measuring or recording the local intensity or power of the radiation on that plane. This method of direct imaging, however, suffers from limited resolution owing to the Rayleigh Criterion.

For example, the Rayleigh Criterion has led to a plethora of large diameter observatories in the quest of higher and higher resolution astronomy. Far-field linear optics can achieve sub-Rayleigh resolution and the long-held Rayleigh Criterion can be a mere limitation of the direct imaging technique.

For example, in direct imaging, photon counting on a 2D plane can be executed in a localized position array of detectors such as in a charge coupled device (CCD). This technique, however, neglects the wave nature of the image photons, treating them purely in a particle capacity. Thus, the phase information of the image may not be acquired.

In direct imaging, the finite dimensions of the optical aperture, D, induces diffraction patterns which limit the angular resolving power of the system from two separate distant physical objects to $\theta=1.22\lambda/D$. If photon counting can be executed on mode by mode basis instead of in a position basis, then the resolution of the system may become quantum limited.

DETAILED DESCRIPTION

Figure 1:
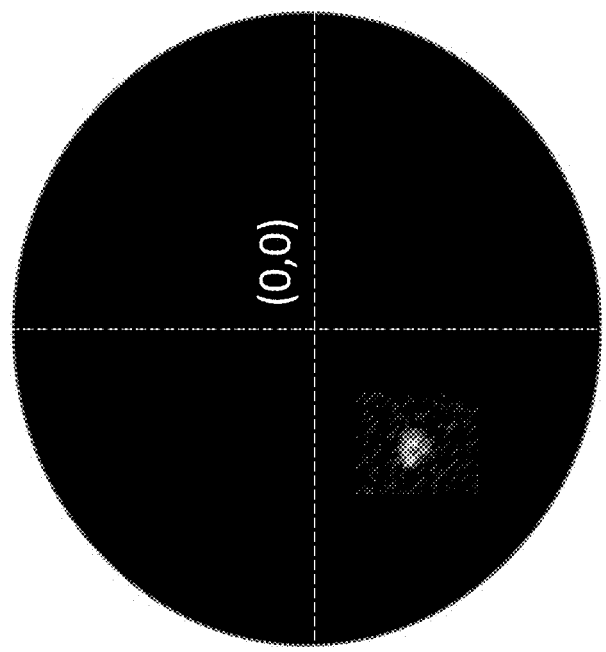
FIG. 1 illustrates an arrangement of a reference to image source in accordance with one or more embodiments of the present disclosure.

As discussed above, direct imaging suffers from limited resolution due to the Rayleigh Criterion. Utilizing an alternative method of imaging, as discussed in the present disclosure, can provide a technique to vastly improve the resolution of an image for a given aperture dimension and image intensity. As disclosed herein, if photon counting can be executed on mode by mode basis instead of in a position basis, the system has the potential to become quantum limited.

The present disclosure may have broad applications to the imaging field whereby incoming radiation can be collected through an aperture. As such, it can improve a wide variety of imaging apparatuses (e.g., microscopes, telescopes, and other imaging devices with apertures for receiving light to be imaged) whereby a direct imaging approach can be taken (e.g., focusing radiation on an image plane whereby the radiation intensity/power is recorded).

The present disclosure can provide a method by which complex sources may be imaged. In previous approaches, only the distance between a few point sources could be determined. However, the embodiments of the present disclosure can provide methods and apparatuses by which an N point source image may be generated. As described herein, "incoming radiation" is radiation that enters the apparatus and can be used to form a "source image".

Embodiments of the present disclosure can treat the source images as a collection of independent of individual point sources. Such embodiments can use the incoherent nature of the image sources to define mathematical distributions of the image modes. The parameters of these modal distributions define the location of the point source from which they originated. A mode in this context can be considered a description of the spatial confinement of one of the system's energy states.

In such a technique, spatial coordinates of any point source of the incoming radiation are described in a coordinate system based upon the hypothetical image plane and the measurement of the modes can then be used to determine the location of the point sources on the hypothetical image plane.

In such an embodiment, the image's accuracy can be theoretically bounded by the quantum resolution limit, but in practice experimental limitations will define the accuracy.

The present disclosure can provide imaging devices and methods whereby full imaging may be realized based upon either using a photonic lantern or an optical grating to separate the guided source image into its modes. In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things, while "a plurality of" something can refer to more than one such things. For example, "a number of components" can refer to one or more components, while "a plurality of components" can refer to more than one component.

As shown in FIG. 1 first the aperture is separated into four quadrants. The target to be imaged (at this point merely an unresolved blur as obtained by direct imaging) is placed in one for four quadrants defined by the aperture. At the center is held the reference point, (x=0,y=0). All the source points locations are measured relative to this reference point.

Figure 2:
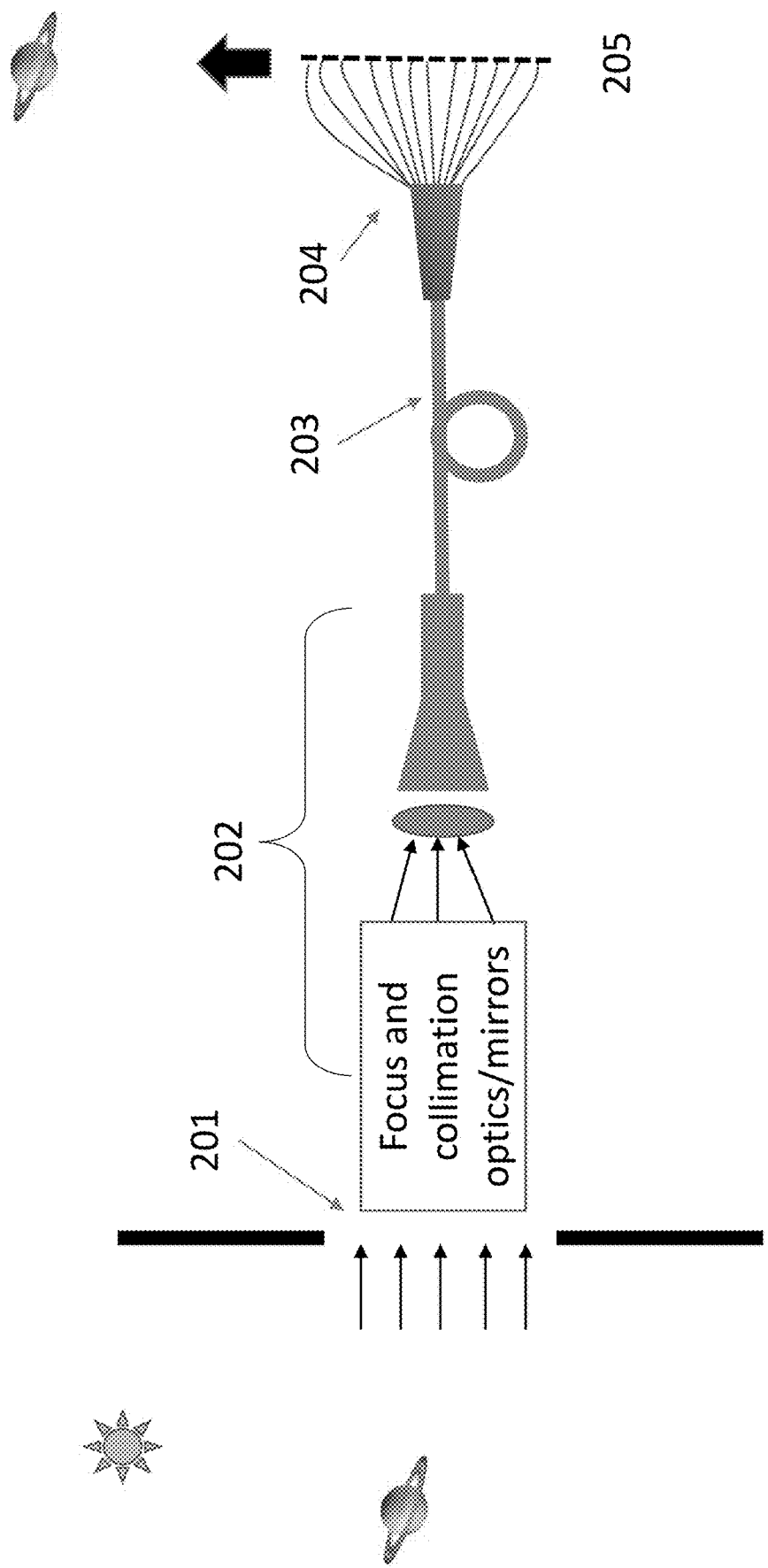
FIG. 2 illustrates a quantum resolution imaging system in accordance with one or more embodiments of the present disclosure.

FIG. 2 illustrates a modal resolution imaging system in accordance with one or more embodiments of the present disclosure. As shown in FIG. 2, a source image can be collected through an aperture 201 of diameter D, into 202 a system of focal and collimation optics and or mirrors. The radiation is then coupled into a fiber or waveguide 203 to establish a confined set of modes.

In FIG. 2 these modes are then separated by a photonic lantern 204 which outputs to an array of detectors 205. For dim sources it may be necessary to utilize single photon detectors, but for bright sources conventional low noise detectors are adequate. The output of the detectors forms a modal distribution which is then analyzed in software to discern the image from which it originated.

Figure 3:
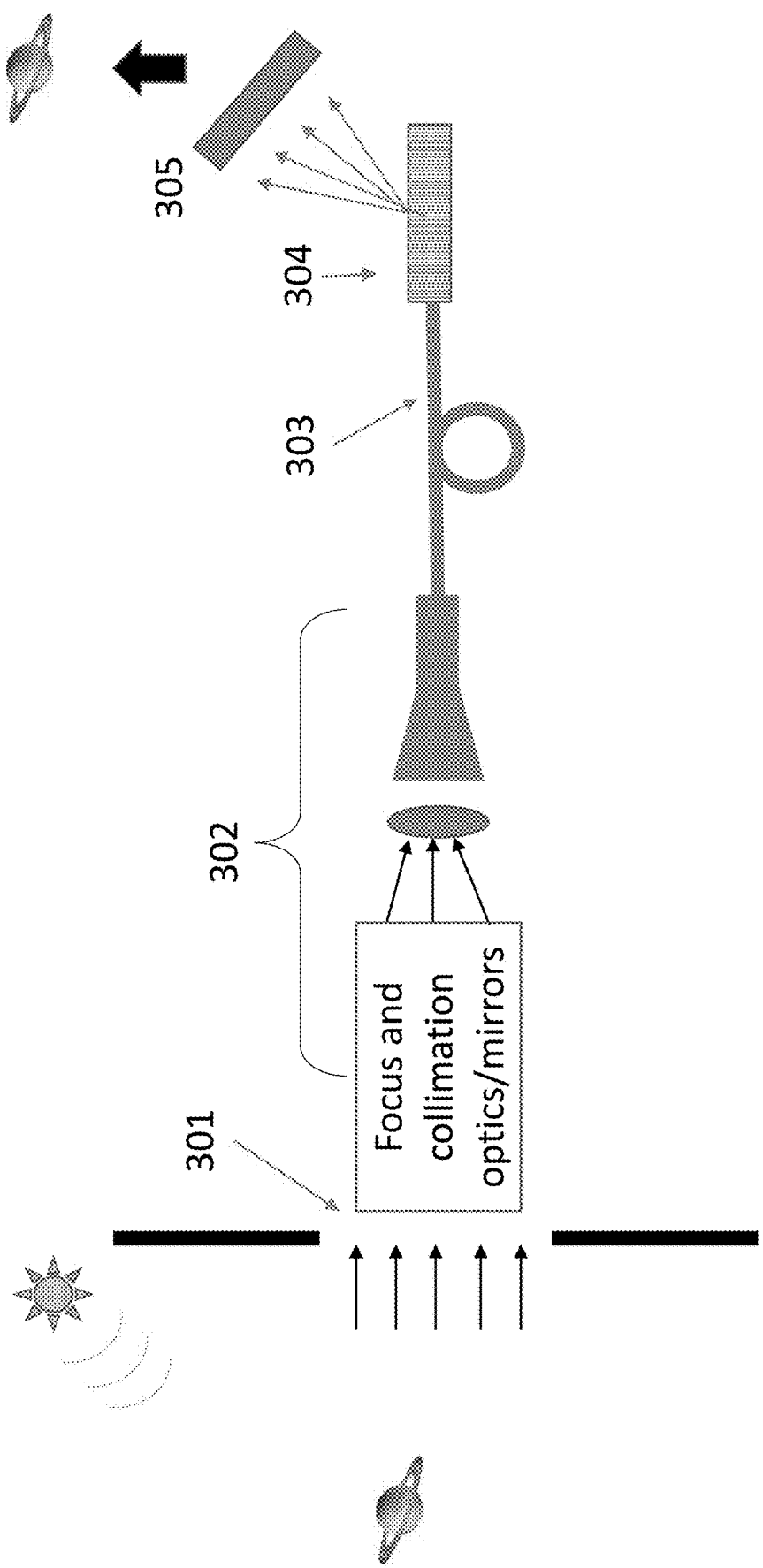
FIG. 3 illustrates a quantum resolution imaging system in accordance with one or more embodiments of the present disclosure.

In FIG. 3 the modes are separated by a diffraction grating 304 instead. Similar to the embodiment shown in FIG. 2, in FIG. 3, a source image can be collected through an aperture 301 of diameter D, into 302 a system of focal and collimation optics and or mirrors. The radiation is then coupled into a fiber or waveguide 303 and through use of the grating 304, each mode scatters at a slightly different angle and into an appropriately spaced array of detectors 305.

As an example of a modal basis, the Hermite Gaussian (HG) functions can form an orthogonal solution set to the paraxial wave equation and can be a good representation for propagation through a fiber system. This system may be affected in other guides as well with an appropriate selection of mode functions:

$$|\phi_{q,r}\rangle = \int\int dx dy \phi_{q,r}(x,y)|x,y\rangle$$

$$\phi_{q,r}(x,y) = \left(\frac{1}{2\pi\sigma_x\sigma_y}\right)^{1/2}\left(\frac{1}{2^{q+r}q!r!}\right)^{1/2}H_q\left(\frac{x}{2\sqrt{\sigma_x}}\right)H_r\left(\frac{y}{2\sqrt{\sigma_y}}\right)e^{-\frac{x^2}{4\sigma_x^2}-\frac{y^2}{4\sigma_y^2}}.$$

Here, $\sigma_x$ and $\sigma_y$ are given by the focal length, f, wavelength, $\lambda$, and x and y dimensions of the diameter where $\sigma = \lambda f/D\pi$. For an optical system, The function $H_q(x)$ refers to the physicist Hermite polynomial as defined in Table of Integrals, Series, and Products, Gradshteyn and Ryzhik (8.950).

In this example, a Gaussian point spread function (PSF) will be used to model the effect of the systems' optics. Although embodiments of the present disclosure are not limited to this representation:

$$|\psi(x,y)\rangle = \int_{-\infty}^{\infty}dx\int_{-\infty}^{\infty}dy\psi(x,y)|x,y\rangle$$

$$\psi(x,y) = \left(\frac{1}{2\pi\sigma_x\sigma_y}\right)^{1/2}\exp\left(-\frac{x^2}{\sigma_x^2}-\frac{y^2}{\sigma_y^2}\right)$$

The overlap of the PSF with the waveguide/fiber modes may summed over all point sources located at $(x_l, y_m)$ and be written as:

$$S(q,r) = \sum_{l=1}^{L}\sum_{m=1}^{M}n_{l,m}(|\langle\phi_{q,r}(x,y)|\psi(x-x_l,y-y_m)\rangle|^2)$$

When the overlap integrals are executed, a form of a product of Poisson distributions can be obtained:

$$S(q,r) = \sum_{l=1}^{L}\sum_{m=1}^{M}n_{l,m}p_{Q_l}(q)p_{R_m}(r) = \sum_{l=1}^{L}\sum_{m=1}^{M}n_{l,m}\frac{1}{q!r!}e^{-Q_l}e^{-R_m}Q_l^q R_m^r$$

$$Q_l = \frac{x_l^2}{4\sigma_x^2} \quad R_m = \frac{y_m^2}{4\sigma_y^2}$$

where the averages $Q_l$ and $R_m$ are related to the $(x_l, y_m)$ location of the point source. Next an image reconstruction technique must distinguish each of the individual Poisson parameters $(n_{l,m}, Q_l, R_m)$ in the composite modal graph. To do this deterministically, we will ultimately employ a transform, but first a Gram Schmidt process is used to establish an orthonormal basis $\xi_i(q), \chi_m(r)$ from the space that $p_{Q_l}(q)$ and $p_{R_m}(r)$ span. Many Gram Schmidt algorithms suffice, the objective is simply to define the orthonormal basis for the defined vectors $P_Q(q)$ and $P_R(r)$ over the specified hypothetical image plane.

$$S(q,r) = \sum_{l=1}^{L}\sum_{m=1}^{M}\alpha_{l,m}\xi_l(q)\chi_m(r)$$

Then, the $\alpha_{lm}$ coefficients may be computed from the measured S(q,r) surface via a transform:

$$\alpha_{l,m} = \sum_{q=1}^{Jmodes}\sum_{r=1}^{Kmodes}S(q,r)\xi_l(q)\chi_m(r)$$

The $n_{lm}$ coefficients are uniquely determined by expanding the $\xi_l$ and $\chi_m$ terms of the $p_{Ql}$ and $p_{Rm}$ and equating coefficients to extract the corresponding $n_{lm}$ term which is the photon count from the point source located at the values indicated by the corresponding Ql, and Rm.

$$S(q,r) = \sum_{l=1}^{L}\sum_{m=1}^{M}\alpha_{l,m}\xi_l(q)\chi_m(r) = \sum_{l=1}^{L}\sum_{m=1}^{M}n_{l,m}p_{Q_l}(q)p_{R_m}(r)$$

An example method to affect this measurement is shown in FIG. 1. One possible method involves acquiring a conventional telescope with sufficient pointing accuracy. If the application requires transmission through the atmosphere, the telescope must also have adequate adaptive optics to compensate for atmospheric distortions. A portion of the incoming radiation can be split off through a dichroic mirror and directed at a Nasmyth fiber port to the modal imaging apparatus which may be outside the telescope itself. The remaining radiation can be used in a conventional sense for the purposes of maintaining accurate tracking, and for atmospheric distortion correction as it is done by closed loop adaptive optics if necessary.

It may also be beneficial to use elliptical graded index fiber 106 or some other such asymmetrical low dispersion waveguide to eliminate x/y symmetry and reduce mode dispersion. This is not required, and it should not introduce excessive mode mixing which can not be calibrated or compensated for in the processing.

The incoming radiation can be collimated prior to being separated into multiple modes. This fiber can be the fused end of a mode selective photonic lantern 204. In some embodiments, the multimode graded index fiber can be elliptical in cross-section.

The photonic lantern 204 can be multi-staged and also can be comprised of elliptical fiber or of different indices to effect N single mode fibers, each carrying a unique mode. The fibers can be fed into an imaging array of multiple array elements, for example, an array of single photon counting modules 205, and then post processed to recreate sub diffraction high resolution image. A free space version of this measurement may also be used if an optical grating 304 is used as the mode separator instead of the photonic lantern.

Quantum information theory may be applied to bound the resolution limit of the mode-based image analysis. For this analysis, the Cramer Rao bound may be used. Thus, the error covariance matrix $\Sigma$ (for a vector of estimators) can form an upper bound on the inverse quantum Fisher information matrix, K. If $\delta$ is defined as $$\delta = (x_l, y_m)$$

then the error bound on variance of this separation parameter may be given by $$K \sim \frac{N_{photons}}{4\sigma^2}.$$

For the method described above, $N_{photons}$ can be defined as the summation of pairs that lead to a position $(x_l, y_m)$ assigned to a specific point source or otherwise unit of detector resolution.

For a direct image, the error in a two point source separation, $\delta$, is typically given by $$\varepsilon_{classical} = \sqrt{\frac{8\sigma^2}{N * \delta^2}},$$

which approaches infinity as the source separation goes to zero. However, in the case of quantum limited measurement, the lower bound may be $$\varepsilon_{quantum} = \sqrt{\frac{4\sigma^2}{N}}.$$

Thus, the error measurement is dependent on the diameter of the aperture via $\sigma$, the flux of photons, and thus duration of the collection time. Nevertheless, it is independent of the point source separation and is strictly a quantum result.

Figure 4:
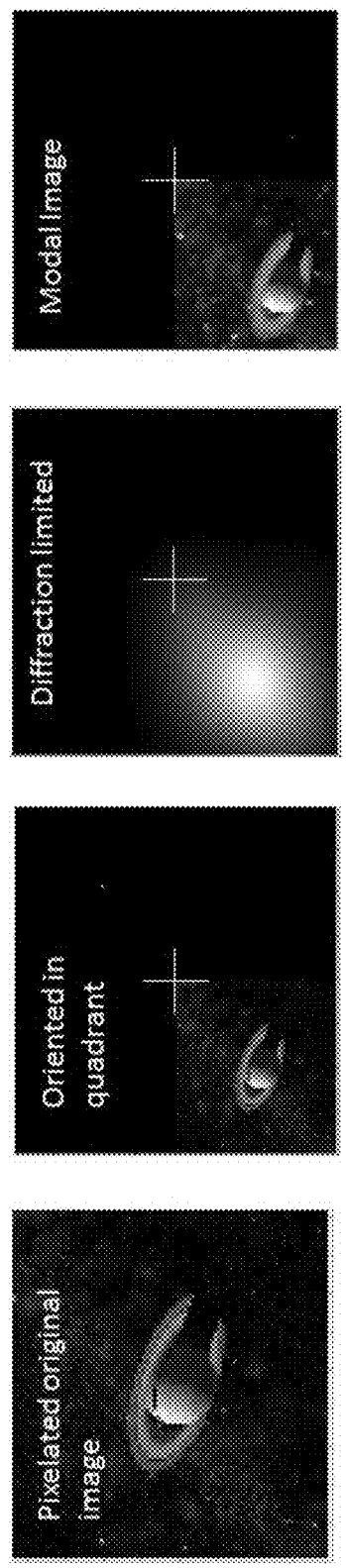
FIG. 4 illustrates several images for comparison of image quality.

FIG. 4 illustrates several images for comparison of image quality. On the left side, a pixelated original image is shown. The image second from the left shows the first image resized and positioned with respect to a reference point. The third image from the left shows a diffraction limited result of the image and the last image shows a modal image created based on an embodiment of the present disclosure.

Provided below are example embodiments and details that may be helpful in clarifying the nature of the concepts of the present disclosure. In a first example embodiment, a quantum resolution imaging device includes an optical component (e.g., aperture s through which light passes) provided to receive incoming radiation.

The device also includes a mode separating structure (e.g., photonic lantern, an optical grating, etc.) for separating the received incoming radiation into multiple modes and an imaging array (e.g., a detector array) having multiple array elements for measuring an energy level of each mode to construct a mode-based image of the received incoming radiation as it comes in contact with a surface of one of the array elements.

In a first method example, a quantum resolution imaging method can, for example, include receiving incoming radiation with an optical component, separating the received incoming radiation into multiple modes (e.g., utilizing a mode separation structure), and measuring an energy level of each mode to construct an image of the received incoming radiation (e.g., utilizing an imaging array).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

What is claimed:

1. A sub-diffraction super-resolution imaging device, comprising:
   an aperture with optical component provided to receive incoming radiation;
   a mode separating structure for separating the received incoming radiation into multiple modes; and
   a detector array having multiple elements for measuring an energy level of each mode to construct a modal distribution of which the image may be reconstructed from.

2. The device of claim 1, wherein the optical component includes an aperture through which incoming light passes.

3. The device of claim 1, wherein the sub-diffraction super-resolution imaging device collimates the incoming radiation into a structure with confined modes.

4. The device of claim 3, wherein the structure with confined modes is one of: a waveguide or optical fiber.

5. The device of claim 3, wherein the fiber is a fused end of a photonic lantern or a waveguide contains a diffraction grating or is directed at a diffraction grating.

6. The device of claim 5, wherein the photonic lantern is comprised of fibers of different indices.

7. The device of claim 6, wherein the fibers are fed into an array of photon counting modules or the diffraction grating scatters its mode separated radiation at an array of detectors.

8. The device of claim 1, wherein the mode separation structure is multi-staged.

9. The device of claim 8, wherein the mode separation structure includes at least one elliptical fiber.

10. The device of claim 8, wherein the mode separation structure includes fibers of different indices to effect N single mode fibers, each carrying a unique mode.

11. The device of claim 1, wherein the multiple elements of the detector array measure an energy level of each mode to construct a mode-based image of the received incoming radiation as it comes in contact with a surface of one of the multiple elements.

12. A quantum resolution imaging method, comprising:
collecting incoming radiation with an aperture and optical components;
directing the radiation into a mode confined structure, separating the received incoming radiation into multiple modes; and
measuring an energy level of each mode to construct an image of the received incoming radiation.

13. The method of claim 12, wherein the method further includes calculating an intensity value of emitted light for a given point source as it would be located on a hypothetical image plane.

14. The method of claim 13, wherein the intensity of the point source is based on the measurements of the energy levels of each mode.

15. The method of claim 12, wherein the source image is constructed based on the plurality of measurements pertaining to the relative distances between reference and source points.

16. The method of claim 15, wherein an error measurement for the relative distances between reference and source points is determined based on aperture diameter.

17. The method of claim 12, wherein the method includes collimating the incoming radiation prior to separating the received incoming radiation into multiple modes.

18. The method of claim 17, wherein after the collimating of the incoming radiation, the radiation is fed into a multi-mode fiber.

19. The method of claim 15, wherein an error measurement for the relative distances between reference and source points is determined based on photon flux.

20. The method of claim 15, wherein an error measurement for the relative distances between reference and source points is determined based on duration time.

* * * * *